US012607779B2

(12) United States Patent
Hansson et al.

(10) Patent No.: US 12,607,779 B2
(45) Date of Patent: Apr. 21, 2026

(54) SEED STRUCTURES FOR STRUCTURED COATINGS FOR OPTICAL AND OTHER DEVICES

(71) Applicant: NIL Technology ApS, Kongens Lyngby (DK)

(72) Inventors: Niklas Hansson, Askim (SE); Ulrich Quaade, Bagsvaerd (DK)

(73) Assignee: NIL Technology ApS, Kongens Lyngby (DK)

( * ) Notice: Subject to any disclaimer, the term of this patent is extended or adjusted under 35 U.S.C. 154(b) by 545 days.

(21) Appl. No.: 17/607,183

(22) PCT Filed: May 13, 2020

(86) PCT No.: PCT/EP2020/063383
§ 371 (c)(1),
(2) Date: Oct. 28, 2021

(87) PCT Pub. No.: WO2020/229563
PCT Pub. Date: Nov. 19, 2020

(65) Prior Publication Data
US 2023/0099506 A1      Mar. 30, 2023

Related U.S. Application Data

(60) Provisional application No. 62/847,522, filed on May 14, 2019.

(51) Int. Cl.
*G02B 1/12* (2006.01)
*B29D 11/00* (2006.01)
(Continued)

(52) U.S. Cl.
CPC .......... *G02B 1/12* (2013.01); *B29D 11/00019* (2013.01); *B29D 11/00865* (2013.01); *G02B 3/04* (2013.01); *G02B 5/1814* (2013.01)

(58) Field of Classification Search
CPC .......... G02B 1/12; G02B 3/04; G02B 5/1814; G02B 3/0012; G02B 5/1809;
(Continued)

(56) References Cited

U.S. PATENT DOCUMENTS

2013/0149500 A1* 6/2013 Bassiri-Gharb ........... B81B 1/00
                                                            428/156
2018/0059291 A1* 3/2018 Li .......................... G02B 1/118
(Continued)

FOREIGN PATENT DOCUMENTS

CN      103227178      7/2013
JP      2007-328096    12/2007
(Continued)

OTHER PUBLICATIONS

Ali et al., "Fabrication of buried nanostructures by atomic layer deposition," Scientific Reports, Oct. 2018, 8(1), 10 pages.
(Continued)

*Primary Examiner* — Matthew Y Lee
(74) *Attorney, Agent, or Firm* — Fish & Richardson P.C.

(57) ABSTRACT

A method includes providing a coating over a surface of a substrate, a plurality of seed structures being disposed on the surface of the substrate, in which respective heights of the seed structures define local thicknesses of the coating. An optical device includes a substrate, a plurality of seed structures on a surface of the substrate, and a coating on the seed structures and on the surface of the substrate, in which respective heights of the seed structures define local thicknesses of the coating.

14 Claims, 7 Drawing Sheets

(51) Int. Cl.
    *G02B 3/04*        (2006.01)
    *G02B 5/18*        (2006.01)

(58) Field of Classification Search
    CPC ............ G02B 5/1847; B29D 11/00019; B29D
               11/00865; C23C 14/0005; C23C 14/046;
               C23C 16/045; C23C 16/45555; C23C
               16/01; C23C 16/45525; H01L 21/0254;
               H01L 21/02565; H01L 21/0262
    See application file for complete search history.

(56)           References Cited

U.S. PATENT DOCUMENTS

| | | | | |
|---|---|---|---|---|
| 2019/0086682 | A1* | 3/2019 | Miller | G02B 1/118 |
| 2019/0154877 | A1* | 5/2019 | Capasso | G02B 1/002 |
| 2019/0324176 | A1* | 10/2019 | Colburn | G03F 7/0035 |
| 2020/0110205 | A1* | 4/2020 | Rahomäki | C23C 16/45525 |
| 2021/0157041 | A1* | 5/2021 | Olkkonen | G02B 27/0172 |
| 2021/0157134 | A1* | 5/2021 | Vartiainen | G02B 27/0172 |
| 2022/0283371 | A1* | 9/2022 | Tekolste | G02B 5/1814 |

FOREIGN PATENT DOCUMENTS

| | | |
|---|---|---|
| WO | WO 2017/176921 | 12/2017 |
| WO | WO 2018/220269 | 12/2018 |
| WO | WO 2018/220271 | 12/2018 |

OTHER PUBLICATIONS

International Search Report and Written Opinion in International Appln. No. PCT/EP2020/063383, dated Dec. 4, 2020, 20 pages.
Invitation to Pay Additional Fees in International Appln. No. PCT/EP2020/063383, dated Aug. 14, 2020, 15 pages.
International Preliminary Report on Patentability in International Appln. No. PCT/EP2020/063383, dated Nov. 25, 2021, 16 pages.
Office Action in Chinese Appln. No. 202080035091.6, mailed on Sep. 30, 2024, 18 pages (with English translation).

* cited by examiner

SEED STRUCTURES FOR STRUCTURED COATINGS FOR OPTICAL AND OTHER DEVICES

CROSS-REFERENCE TO RELATED APPLICATIONS

This application is a National Stage Application under 35 U.S.C. § 371 and claims the benefit of International Application No. PCT/EP2020/063383, filed May 13, 2020, which claims priority to U.S. Application No. 62/847,522, filed May 14, 2019, entitled MULTILEVEL OPTICAL STRUCTURES AND METHOD FOR PREPARING SUCH STRUCTURES the disclosure of which is incorporated herein by reference.

CROSS-REFERENCE TO RELATED APPLICATION(S)

This application claims the benefit of priority of U.S. Provisional Patent Application No. 62/847,522, filed May 14, 2019, the entire disclosure of which is incorporated herein by reference.

FIELD OF THE DISCLOSURE

The present disclosure relates to seed structures for structured coatings for optical and other devices.

BACKGROUND

Coatings on substrates can provide a variety of device functionalities, including optical functionalities. For example, coatings with suitable structures can provide diffractive optical effects, including lensing, light diffusing, focusing, and beam shaping. Such structured coatings may include stepped, multi-level coatings, coatings having varying thicknesses, and coatings having particular surface profiles.

SUMMARY

In one aspect, the present disclosure describes a method that includes providing a coating over a surface of a substrate, a plurality of seed structures being disposed on the surface of the substrate, in which respective heights of the seed structures define local thicknesses of the coating.

Implementations of the method may include one or more of the following. The local thicknesses of the coating define a diffractive optical element formed by the coating. The plurality of seed structures are disposed on an underlying stepped surface of the substrate, in which an exposed surface of the coating has a profile corresponding to a profile defined by distal surfaces of the seed structures, and in which an underlying surface of the coating follows the underlying stepped surface of the substrate. Providing the coating includes depositing the coating using a surface growth technique, and the coating is grown at least in part from surfaces of the plurality of seed structures. The coating is deposited using atomic layer deposition or chemical vapor deposition.

Implementations of the method may include one or more of the following. The plurality of seed structures include at least one of pillars or walls. The plurality of seed structures are projections from the surface of the substrate, and at least some of the projections have a height that differs from a height of other ones of the projections. The coating fills in spaces between adjacent seed structures. The method includes, subsequent to providing the coating, removing part of the coating, so that at least portions of the surface of the substrate on which no seed structures are disposed have no overlying coating. The substrate is a first substrate, and the method further includes attaching a second substrate to an exposed surface of the coating, and removing the first substrate and the seed structures. The method further includes, subsequent to removing the first substrate and the seed structures, providing a further coating such that voids left by the removed seed structures are filled in by the further coating. The method includes, prior to providing the coating, imprinting a receiving material to form the seed structures on the surface of the substrate.

The disclosure also describes optical devices. In one aspect, the present disclosure describes an optical device including a substrate, a plurality of seed structures on a surface of the substrate, and a coating on the seed structures and on the surface of the substrate, in which respective heights of the seed structures define local thicknesses of the coating.

Implementations of the optical device may include one or more of the following. The local thicknesses of the coating define a diffractive optical element formed by the coating. The diffractive optical element is a lens. The plurality of seed structures are projections from the surface of the substrate, and at least some of the projections have a height that differs from a height of other ones of the projections. The coating fills in spaces between adjacent seed structures.

In one aspect, the present disclosure describes an optical device including a substrate, and a coating on a surface of the substrate, in which a plurality of voids are formed in the coating, and in which the coating forms at least one optical element. In some implementations, the voids project from a surface of the coating towards the surface of the substrate, and portions of the coating in which the voids are formed include at least two different thicknesses.

The disclosure also describes modules. In one aspect, the present disclosure describes a module including at least one of a light-emitting device or a light-sensitive device; and an optical device as described in the disclosure, in which the optical device is configured (i) to interact with light generated by the light emitting device or (ii) to interact with light incident on the module such that light passing through the optical device is received by the light-sensitive device.

Particular implementations of the subject matter described in this disclosure can be implemented to realize one or more advantages. For example, in some implementations, a fabrication process may be less complex, time-consuming, and/or expensive. In some implementations, highly complex and varied structured coatings may be fabricated. In some implementations, an optical device may be more compact and/or efficient. In some implementations, a structured coating may be composed of a higher refractive index material.

The details of one or more implementations are set forth in the accompanying drawings and the description below. Other aspects, features and advantages will be apparent from the description and drawings, and from the claims.

DETAILED DESCRIPTION

The present disclosure relates to seed structures for structuring substrate coatings. In particular implementations, this disclosure describes seed structures disposed on a substrate surface, respective heights of the seed structures defining local thicknesses of the coating.

Coatings on substrates can provide a variety of device functionalities, including optical functionalities. For example, coatings with suitable structures can provide diffractive optical effects, including lensing, light diffusing, focusing, and beam shaping. Such structured coatings may include stepped, multi-level coatings, coatings having varying thicknesses, and coatings having particular surface profiles.

However, structured coatings may be difficult or expensive to manufacture. For example, using some known photolithographic techniques, to produce an eight-level optical structure, at least three exposures and three etching steps may be necessary. This may make the fabrication process time-consuming and expensive, with fabrication time and expense increasing with each additional level of the optical structure. Other types of coating structures (e.g., coatings forming domes or pyramids on a substrate surface) may present even greater manufacturing challenges.

Therefore, in some cases, it may be beneficial to employ seed structures in fabrication processes and devices, in order to decrease fabrication complexity, time-consumption, and expense, and/or in order to create structured coatings.

Figures 1A, 1B:
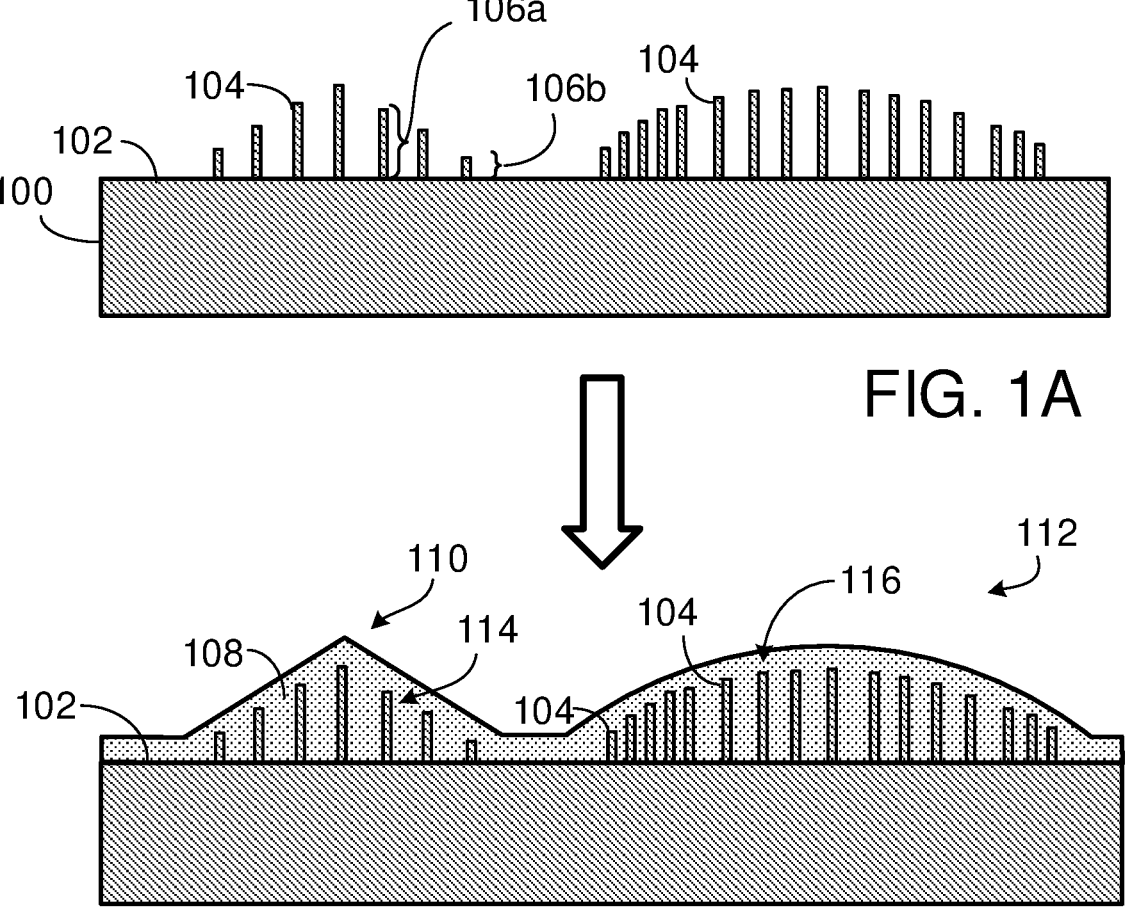
FIGS. 1A-1B are schematics showing an example of a structured coating fabrication process and device.

As shown in FIG. 1A, some implementations include seed structures 104 disposed on a surface 102 of a substrate 100. The seed structures 104 project from the surface 102 of the substrate 100 and may have varying heights (for example, heights 106a and 106b).

In some implementations, the seed structures 104 are extensions of the substrate 100, e.g., formed of the same material as the substrate 100. In some implementations, the seed structures 104 are formed of a material different from the substrate 100, e.g., deposited onto the substrate surface 102, or formed from a film provided on the substrate surface 102.

As shown in FIG. 1B, a coating 108 is provided on the substrate surface 102 and the seed structures 104, and fills regions between adjacent ones of the seed structures 104. Respective heights of the seed structures 104 define local thicknesses of the coating 108, such that the coating 108 forms structures, e.g., a pyramid 110 and a dome 112. The coating 108, therefore, may be referred to as a structured coating.

The respective heights of the seed structures 104 define local thicknesses of the coating; however, in some implementations, the respective heights of the seed structures may not necessarily equal the local thicknesses of the coating. Rather, in some implementations, variations in the heights of the seed structures correspond to variations in local thicknesses of the coating. In some implementations, the local thickness of the coating is a defined offset larger or smaller than heights of the seed structures. In some implementations, a structure formed by the coating corresponds to a structure of the underlying seed structures.

In some implementations, the coating 108 is deposited using a surface growth technique, in which coating 108 grows approximately perpendicularly from surfaces (including, for example, the substrate surface 102, sidewalls 114 of the seed structures, and distal surfaces 116 of the seed structures), such that the coating 108 forms a conformal covering over the underlying surfaces.

When the coating 108 is deposited using a surface growth technique or another method in which the coating builds up from underlying surfaces, the respective heights of the seed structures 104 may define local thicknesses of the coating 108 by providing an underlying surface over which the coating may form and/or grow. For example, if a coating thickness x is disposed over a portion of the substrate surface 102 having no seed structures 104, then approximately the same coating thickness x may be disposed over a seed structure having a height h, such that a surface of the coating over the seed structure is approximately a height x+h over the substrate surface 102. Thus, in some instances, an area of the substrate having a taller seed structure will result in a corresponding greater local thickness of the coating, defined in reference to the substrate surface 102, whereas an area of the substrate having a shorter seed structure will result in a corresponding smaller local thickness of the coating.

When the coating 108 is deposited using a surface growth technique or another method in which the coating builds up from underlying surfaces, the seed structures 104 may cause the coating to fill in spaces between adjacent seed structures 104 by growing outward (e.g., from one seed structure 104 to another seed structure 104) from sidewalls 114 of the seed structures 104. In some implementations, if the coating 108 has a thickness x, defined in reference to the surface from which the coating 108 is growing (e.g., in various examples, vertically from the substrate surface 102, or horizontally, parallel to the substrate surface 102, from sidewalls 114 of the seed structures), then neighboring seed structures may be spaced apart from one another at a distance of less than 2x, such that the coating 108 fills an entire space between the neighboring seed structures.

Deposition methods for providing the coating 108 may include one or more of atomic layer deposition (ALD), vapor deposition (for example, chemical vapor deposition, plasma-enhanced chemical vapor deposition, or metalorganic vapor deposition), or physical vapor deposition (for example, thermal evaporation or sputtering). In some implementations, deposition parameters are selected in order to promote conformal growth of the coating 108. For example, a relatively low deposition vacuum may be used in a sputtering process, such that the coating material is more likely to scatter and coat underlying sidewalls.

The coating 108 may include, for example, an oxide (e.g., one or more of $Al_2O_3$, $TiO_2$, $SiO_2$, ITO, HfO, $Ta_2O_5$, $LiNbO_3$, or $ZrO_2$).

The coating 108 may include, for example, a nitride (e.g., one or more of AN, GaN, and $Si_3N_4$).

The coating 108 may include other materials. For example, the coating 108 may include ZnSe or another compound useful in optical devices. The coating 108 may include an organic compound, e.g., a polymer. The coating 108 may include one or more of a metal (e.g., in order to provide plasmonic effects) or a dielectric.

In some cases, the coating 108 may have a thickness anywhere between tens of nanometers and hundreds of microns. In some implementations, the coating 108 has a thickness between about 20 nm and about 200 nm.

In the absence of the seed structures 104, the coating 108 may form a relatively featureless film on the substrate surface 102. Or, in order to fabricate the structures 110, 112 using other methods, it may be necessary to perform a more complex, lengthy, or expensive fabrication process. However, because of the seed structures 104, the coating 108 forms structures 110, 112 directly while providing the coating.

Although the substrate surface 102 in FIGS. 1A-1B is shown as flat, in some implementations the substrate surface may be patterned (e.g., stepped or roughened) or curved.

Structures formed by the coating 108 (e.g., structures 110 and 112) may include optical elements, e.g., diffractive optical elements (DOE). An optical functionality of the structures may include, for example, one or more of lensing, reflecting or anti-reflecting, beamsplitting, focusing, or optical diffusing. The structures may be microlenses, such that a plurality of the structures form a microlens array. The structures may include a grating, e.g., a diffraction grating. The structures may include and/or form a metasurface having an optical functionality.

The seed structures 104 may be provided in many different shapes, e.g., pillars (square, round or rectangular), walls, or ridges, and may be distributed in different lattice arrangements or in different geometries, e.g., forming closed loops or dashed lines. The seed structures 108 may be arranged in one or more of periodic, regular, or random geometries.

Different combinations of shapes of the seed structures 104 themselves, arrangements of the seed structures, and surface structures of the substrate surface underlying the seed structures, lead to the formation of different structures in the resulting coating. The seed structure-based process is highly flexible, able to generate highly complex and varied structured coatings while maintaining relatively low manufacturing complexity and cost.

In some implementations, it may be beneficial for the seed structures 104 to be relatively thin, in order to decrease an effect of the seed structures (e.g., an optical effect of the seed structures) in a fabricated device including seed structures and a structured coating. In some implementations, the seed structures may have widths of at least about 10 nm, at least about 20 nm, or at least about 50 nm. In some implementations, the seed structures may have widths less than about 500 nm, less than about 200 nm, or less than about 100 nm.

In some implementations, the seed structures may have heights of at least about 20 nm, at least about 50 nm, at least about 100 nm, or at least about 200 nm. In some implementations, the seed structures may have heights less than about 5 μm, less than about 2 μm, less than about 1 μm, or less than about 500 nm.

In some implementations, the seed structures may be spaced apart from each other at distances less than a wavelength of light with which optical structures formed by the coating are configured to interact. This may suppress undesired diffraction effects caused by the seed structures. In some implementations, seed structures may be spaced apart from each other at a distance less than about 800 nm, less than 500 nm, or less than about 300 nm.

In some implementations, the seed structures 104 and/or the substrate 100 are formed from one or more of a polymer, a hybrid polymer, an epoxy, an acrylic, a thermoplastic, or a resin. In some implementations, the seed structures 104 and/or the substrate 100 are formed from a material suitable for use as a replica in a replication process. In some implementations, the seed structures 104 and/or the substrate 100 are formed from a transparent material (e.g., a material transparent to a wavelength of light with which the structured coating is configured to interact). In some implementations, the seed structures 104 and/or the substrate 100 are formed from a material suitable for provision of the coating 108. For example, if the coating 108 is provided by an ALD process, the seed structures 104 and/or the substrate 100 may be formed from a material that will not be degraded by the ALD process.

In some implementations, the seed structures are formed as part of a replication process. In general, replication refers to a technique by means of which a given structure or a negative thereof is reproduced, e.g., etching, embossing, imprinting, stamping, or molding. In a particular example of a replication process, a structured surface is embossed into a liquid, viscous, or plastically deformable material, then the material is hardened, e.g., by curing using ultraviolet radiation or heating, and then the structured surface is removed. Thus, a replica (which in this case is a negative replica) of the structured surface is obtained.

The replicated structure provides a mechanical, electrical, or optical functionality (or a combination of those functionalities) due to the structure imposed by the structured surface.

In some cases, replication may be implemented as a stamping process. In the case of a stamping process, which also may be referred to as an imprinting process, the structured surface is a surface of a stamp that is pressed into the liquid, viscous, or plastically deformable material (or has the liquid, viscous, or plastically deformable material pressed into it).

While the liquid, viscous, or plastically deformable material in an imprinting process may be a bulk material (for example, a block of material), in other implementations the liquid, viscous, or plastically deformable material is a coating provided on a substrate surface.

In an example of a replication process to provide seed structures on a substrate surface, photoresist may be deposited on a metal layer on a silicon wafer. The photoresist may be patterned, for example, using photolithography or electron-beam lithography, and etching (e.g., dry etching or wet etching) may be performed to produce patterns in the metal. One or more subsequent lithography and/or etching steps may be performed to produce a structured metal surface on the silicon wafer.

In some implementations, the structured metal surface on the silicon wafer then may be used as a master stamp for producing seed structures. For example, the structured metal surface may have a reverse structure to the seed structures 104 of FIG. 1A. Such a structured metal surface may be pressed into a liquid, viscous, or plastically deformable material to define the seed structures 104 in the liquid, viscous, or plastically deformable material. After one or more curing steps, the seed structures 104 may be used to structure a coating as described above in reference to FIG. 1B.

Although replication may be used to form complex structures, in some implementations, not all materials are fully suitable for undergoing a replication process. For example, some or all of the nitrides, oxides, and other materials that may be included in a coating 108, as described above, may not be sufficiently liquid, viscous, or plastically deformable to be used as a replica in a replication process.

In particular, some materials having a relatively high refractive index (RI) for visible, ultraviolet, and/or infrared light may not be sufficiently liquid, viscous, or plastically deformable to be used as a replica in a replication process.

Some or all of the nitrides, oxides, and other materials that may be included in a coating 108, as described above, may have a relatively high RI.

In various implementations, high RI materials may include materials having an RI of at least about 1.5 for visible, ultraviolet, and/or infrared light, at least about 2.0 for visible, ultraviolet, and/or infrared light, or at least about 2.5 for visible, ultraviolet, and/or infrared light. In some implementations, high RI materials may include materials having a higher refractive index than another particular material or component. For example, in some implementations, the coating 108 has a higher refractive index than the seed structures 104 and/or the substrate 100, such that the coating 108 may be referred to as a high RI material in comparison to the seed structures 104 and/or the substrate 100.

High RI materials may be useful in optical devices, including optical devices having a coating formed on a substrate as described in this disclosure. A coating (e.g., a structured coating 108) having a high RI may interact more or less with light, or interact differently with light, in a way that provides benefits for device operation. For example, a high RI structured coating may form diffractive optical elements capable of a greater degree, precision, and/or efficiency of optical interaction (e.g., lensing or light-bending) than if the coating were formed of a lower RI material. This may allow devices incorporating the high RI structured coating to be more compact and/or more efficient than devices incorporating a lower RI structured coating.

In addition, the use of high RI structured coatings in devices may help avoid or alleviate environment-induced failure modes. For example, if a diffractive optical element formed by a structured coating is filled or covered with water, moisture, grease or another accidental contaminant, the standard optical function of the diffractive optical element may be impaired. If the diffractive optical element has an RI close to an RI of the contaminant, the diffractive power of the diffractive optical element may be decreased, such that light (e.g., light coming from a concentrated light source) passes through the diffractive optical element without the desired optical effect, causing a device including the diffractive optical element to malfunction. In some examples, the misdirected light may cause health risks, e.g., eye damage.

Therefore, in some implementations, it may be beneficial for the structured coating to be formed from, or to include, a high RI material, such that a difference in RI between the coating and likely contaminants (which, in some examples, may have RI between about 1.0 and about 1.5) is increased, thereby decreasing or eliminating potential harmful effects of the contaminants.

It may be beneficial to fabricate such a high RI structured coating using a replication process, in order to decrease a complexity, time consumption, and/or expense of the fabrication process. However, as described above, some high RI materials may not be suitable for replication. Therefore, in order to fabricate high RI structured coatings while decreasing fabrication complexity, the seed structures may be formed using replication, and then the coating may be provided on the seed structures, respective heights of the seed structures defining local thicknesses of the coating (as described above) in order to form high RI optical elements. In such implementations, the seed structures provide an advantage over alternative fabrication methods to form the high RI optical elements.

Figures 2A, 2B, 2C:
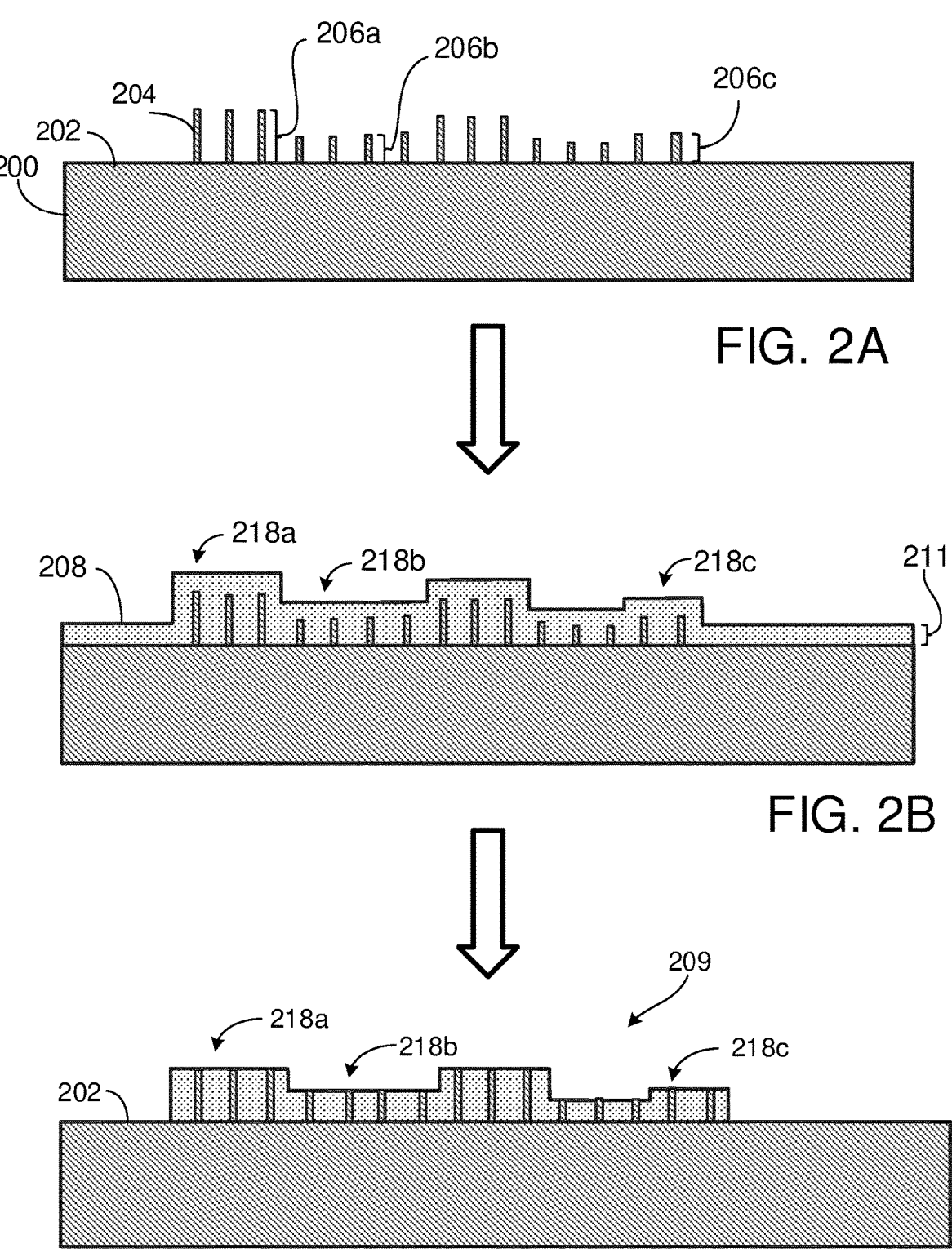
FIGS. 2A-2C are schematics showing an example of a structured coating fabrication process and devices.

FIGS. 2A-2C show another example of a method including seed structures. As shown in FIG. 2A, a substrate 200 has seed structures 204 disposed on a substrate surface 202. Respective example groups of neighboring seed structures 204 have heights 206a, 206b, and 206c.

As shown in FIG. 2B, a coating 208 is provided on the substrate surface 202 and on the seed structures 204. Due to the respective heights of the seed structures 204, the coating 208 is structured to include (for example) ledges 218a, 218b, 218c having heights corresponding to the heights 206a, 206b, 206c of the underlying seed structures. As described above, the multi-level structure of the coating 208 of FIG. 2B may be more complex, time-consuming, and/or expensive to fabricate by other means.

In some implementations, the structure shown in FIG. 2B is further processed in order to remove the coating 208 from portions of the substrate surface 202 on which no seed structures 204 are disposed. For example, the coating 208 may be etched to produce the device 209 shown in FIG. 2C. The etching may remove a defined (e.g., predetermined) depth of the coating across the substrate surface 202, the defined depth in some implementations corresponding to a pre-etching thickness of the coating 208 on portions of the substrate surface 202 on which no seed structures 204 are disposed (e.g., thickness 211 in FIG. 2B).

In some implementations, removing the coating 208 from portions of the substrate may reduce or eliminate the occurrence of delamination of the coating, e.g., delamination during dicing of the substrate. Removal of the coating 208 from portions of the substrate also may reduce or eliminate the occurrence of delamination of the coating during stressing of a device. For example, temperature cycling, high temperatures, and/or high humidity may cause coating delamination in a fabricated device. Removing the coating from portions of a substrate on which no seed structures are disposed (leaving, for example, only coating portions that form optical structures defined by seed structures) may reduce or eliminate the occurrence of such delamination.

Subsequent to removal of the defined depth of the coating 208, the coating 208 may retain some or all of the structure the coating 208 had before removal (e.g., as shown in FIG. 2C, the ledges 218a, 218b, 218c of the coating 208 remain after coating removal, though respective heights of the ledges with respect to the substrate surface 202 are decreased).

In some implementations, the etching may remove portions of the seed structures 204 along with portions of the coating 208.

In some implementations, seed structures 204 are retained in a device at the end of fabrication. For example, the device shown in FIG. 2C may be directly used to provide an optical functionality, even with the seed structures 204 intact inside the coating 208.

This may modify optical characteristics of the device, at least because, in some implementations, the seed structures may have a different RI than the coating.

In such implementations, the seed structures 204 may be designed to be relatively thin (as described above), in order to decrease an optical effect of the seed structures. In addition, or alternatively, the seed structures and/or coating 208 (including structures formed by the coating) may be designed taking into account the optical properties of the seed structures, such that a particular overall optical functionality of the device is achieved.

FIGS. 3A-3E show another example of a method and device including seed structures. In this example, seed structures are removed from a device after the coating is provided.

Figures 3A, 3B, 3C:
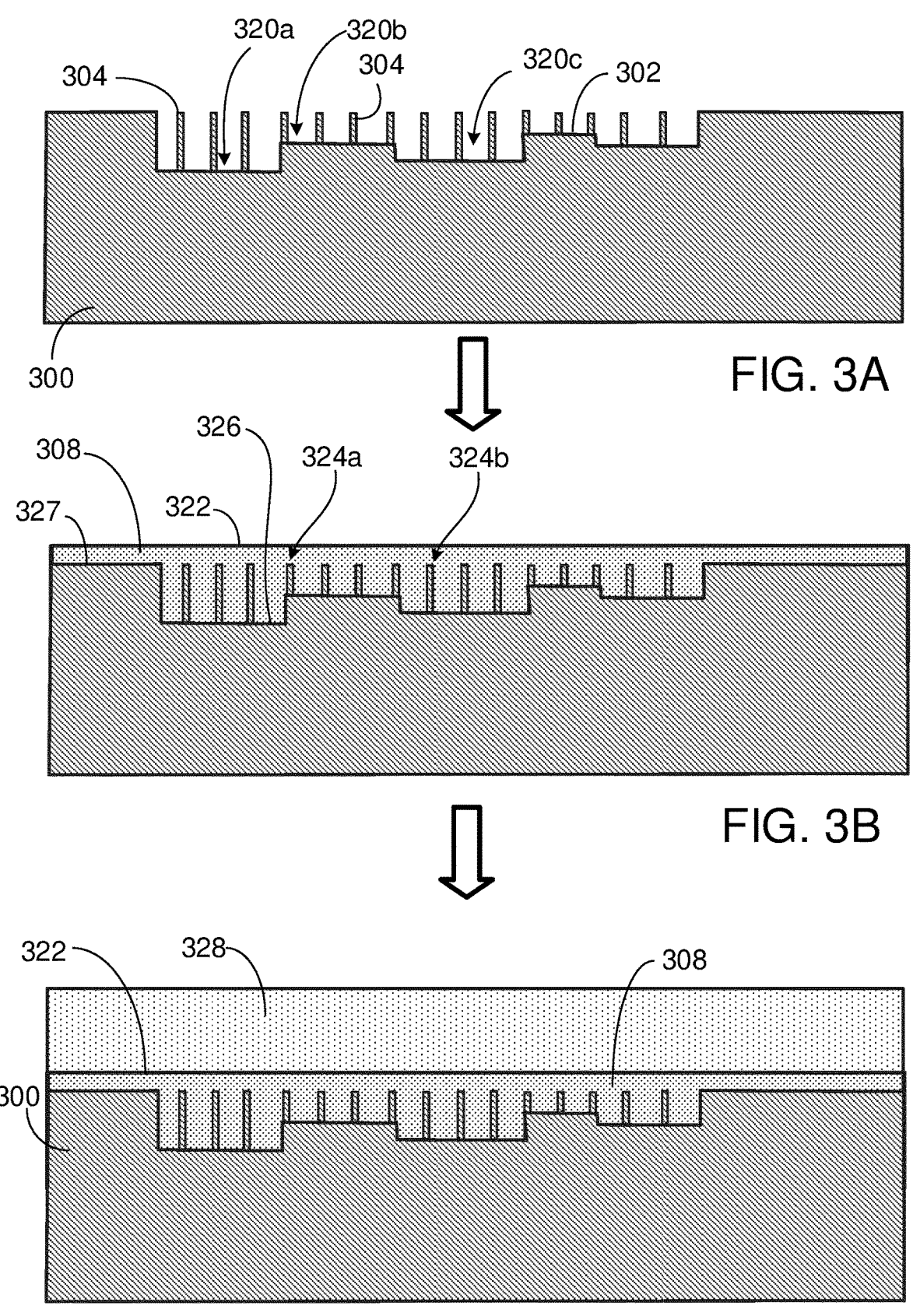
FIGS. 3A-3E are schematics showing an example of a structured coating fabrication process and devices.

As shown in FIG. 3A, a substrate 300 has seed structures 304 provided on a substrate surface 302. In this example, the substrate surface 302 is stepped, e.g., includes steps 320*a*, 320*b*, 320*c*.

As shown in FIG. 3B, a coating 308 is provided on the seed structures 304 and on the substrate surface 302. Respective heights of the seed structures 304, which project from the steps of the substrate surface 302 with different heights, define local thicknesses of the coating 308.

An exposed or outer surface 322 of the coating 308 has a profile corresponding to a profile defined by distal surfaces (e.g., distal surfaces 324*a*, 324*b*) of the seed structures 204. An underlying surface 326 of the coating follows the underlying stepped surface 302 of the substrate.

In the example of FIG. 3B, the seed structures have distal surfaces in line with a highest point (e.g., point 327) of the substrate surface 302. Therefore, the exposed surface 322 of the coating 308 has a substantially flat profile. In some implementations, a substantially flat profile of the exposed surface 322 of the coating 308 may be useful (e.g., for providing a flat surface for receiving or transmitting light, or for providing a flat surface for attachment to a second substrate). In some implementations, after the coating 308 is provided, the exposed surface 322 may be processed (e.g., mechanically and/or chemically processed) in order to flatten the exposed surface 322.

In the absence of the seed structures 304, the coating 308 may conformally coat the underlying stepped surface 302 of the substrate, such that the exposed surface 322 approximately follows the steps of the stepped surface 302. However, the presence of the seed structures 304 allows the coating 308 to have a substantially flat profile defined by the distal surfaces of the seed structures.

As described above, the structure of the stepped substrate surface 302 and/or the seed structures 304 may be formed using a replication process (e.g., an imprinting process).

As shown in FIG. 3C, a second substrate 328 is attached to the exposed surface 322 of the coating 308. For example, the second substrate 328 may be bonded to the exposed surface 322 by an adhesive. In some implementations, the second substrate 328 is bonded directly to the coating 308 based on an adhesion of one or both of the second substrate 328 and the coating 308.

In various implementations, the second substrate 328 may include a glass, Si, ZnSe, Ge, polymers, hybrid polymers or other materials. In some implementations, the second substrate 328 includes a transparent material (e.g., a material transparent to at least one of visible or infrared light, or a material transparent to a wavelength of light with which the coating is configured to interact), such that light may be transmitted through the second substrate 328 to, or from, the coating 308 and structures formed by the coating 308.

In some implementations, the second substrate 328 is composed of a high RI material. As previously described, the substrate 300 and seed structures 304 may be formed in a replication process, such that, in some implementations, the substrate 300 and seed structures 304 have a lower refractive index than the coating 308. However, it may be beneficial to form the coating 308 on a high RI material incompatible with a replication process (e.g., a high RI second substrate 328 may provide benefits for optical performance). Therefore, the structured coating 308 may be formed initially using lower-RI seed structures 304, and subsequently transferred to the higher-RI second substrate 328.

Figures 3D, 3E:
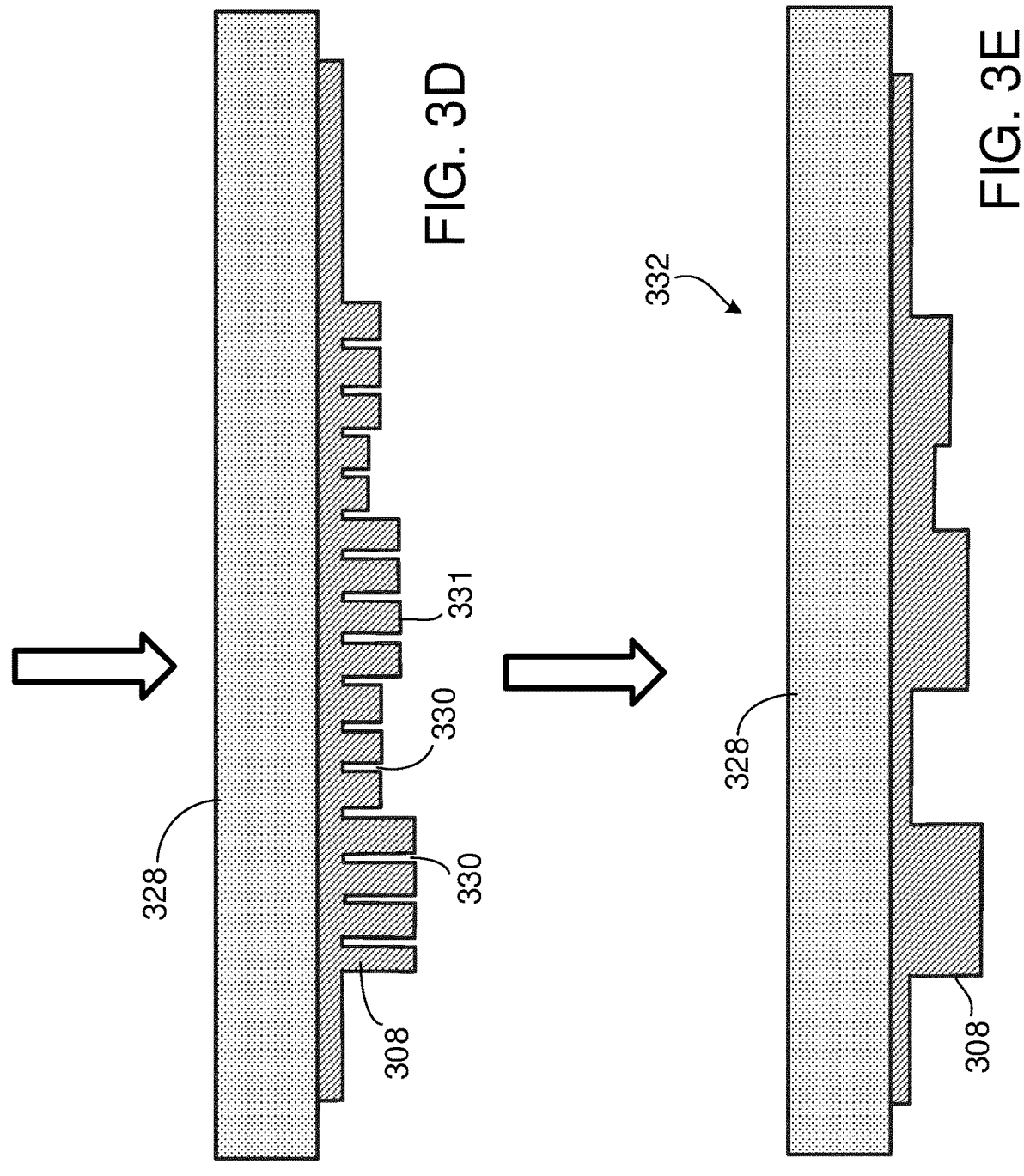

As shown in FIG. 3D, the substrate 300 and the seed structures 304 are removed, leaving behind the coating 308 bonded to the second substrate 328. Voids 330 remain where the seed structures 304 were previously embedded in the coating 308. In this example, the voids project from a surface 331 of the coating towards the surface of the second substrate 328. The coating 308 includes portions of multiple thicknesses, corresponding to the coating thicknesses defined previously by the seed structure 304 and by the steps of the substrate surface 302.

For example, in some implementations, the substrate 300 and the seed structured are composed of a soluble material, such that immersion of some or all of the device shown in FIG. 3C in a suitable solvent results in dissolution of the substrate 300 and seed structures 304, leaving the structure shown in FIG. 3D.

In some implementations, the coating 308 may be etched (as described above in reference to FIG. 2C) prior to or subsequent to transfer to the second substrate 328.

The structure of FIG. 3D may exhibit enhanced optical functionality (e.g., a greater degree and/or precision of light interaction and/or manipulation, or a higher efficiency of optical performance) compared to a device in which seed structures remain embedded in a structured coating. The enhanced optical functionality may be at least because the voids 330 may have a lower RI than the seed structures 304.

In some implementations, the voids 330 are filled in by further addition of the coating material, as shown in FIG. 3E. The resulting device 332 includes a multi-level structured coating 308 on the second substrate 328. As previously described, fabricating the multi-level device 332 by other methods may be more expensive or time-consuming than fabricating the device 332 using the methods disclosed here, e.g., using seed structures.

Because the voids 330 have been filled in, the device 332 may, in some instances, exhibit enhanced optical functionality (e.g., a greater degree and/or precision of light interaction and/or manipulation, or a higher efficiency of optical performance) compared to a device in which the voids remain in the coating. The enhanced optical functionality may be achieved at least because the coating has a higher refractive index than the voids, such that the coating presents a more optically consistent structure to incoming light.

The further provision of coating 308 to fill the voids 330 (see FIG. 3E) may be performed, for example, using a conformal deposition process, e.g., atomic layer deposition, or another deposition process as described above in reference to FIG. 1B.

In some implementations, the further addition of coating may include a different coating material than a coating material initially included in the coating 308.

Although surfaces of the coating have been shown as flat (e.g., the exposed surface 322 of the coating in FIG. 3B), in some implementations coating surfaces may not be flat. For example, a coating surface may be wavy, with the surface profile higher where there is an underlying seed structure and lower where there is no underlying seed structure.

Figure 4:
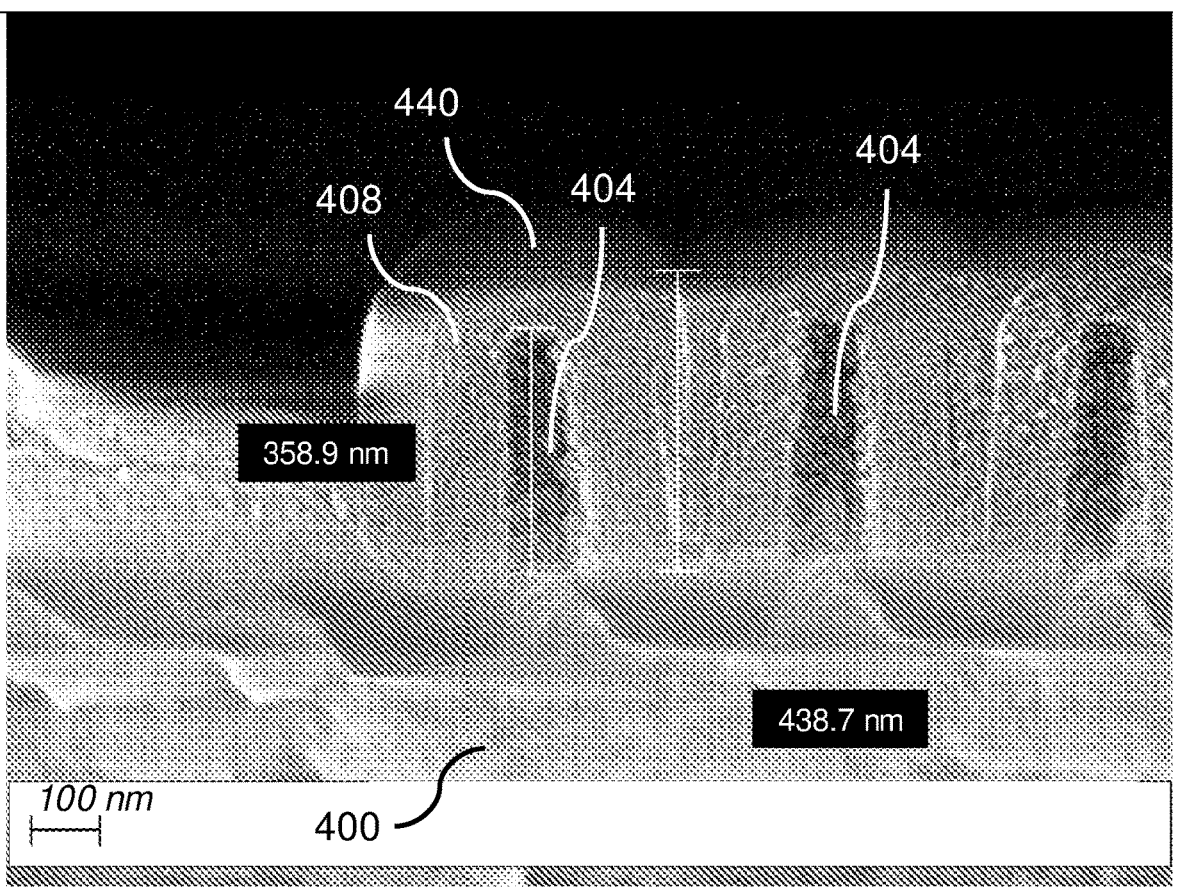
FIG. 4 is a scanning electron micrograph showing an example of seed structures and a structured coating.

For example, FIG. 4 shows a scanning electron micrograph of a device including a coating 408 and seed structures 404 on a substrate 400, respective heights of the seed structures 404 defining local thicknesses of the coating 408. An exposed or upper surface 440 of the coating 408 is wavy, based on the presence of an underlying seed structure 404 on selected regions of the substrate surface. A profile of a top surface of a structured coating may be taken into account (e.g., in optical calculations predicting device performance) when the device is designed.

In some implementations, an exposed surface of the coating has a profile that depends on one or more of a method of deposition of the coating, a thickness of the coating, shapes of underlying seed structures, and/or arrangements of underlying seed structures (e.g., a lattice spacing of a lattice of seed structures).

Figure 5:
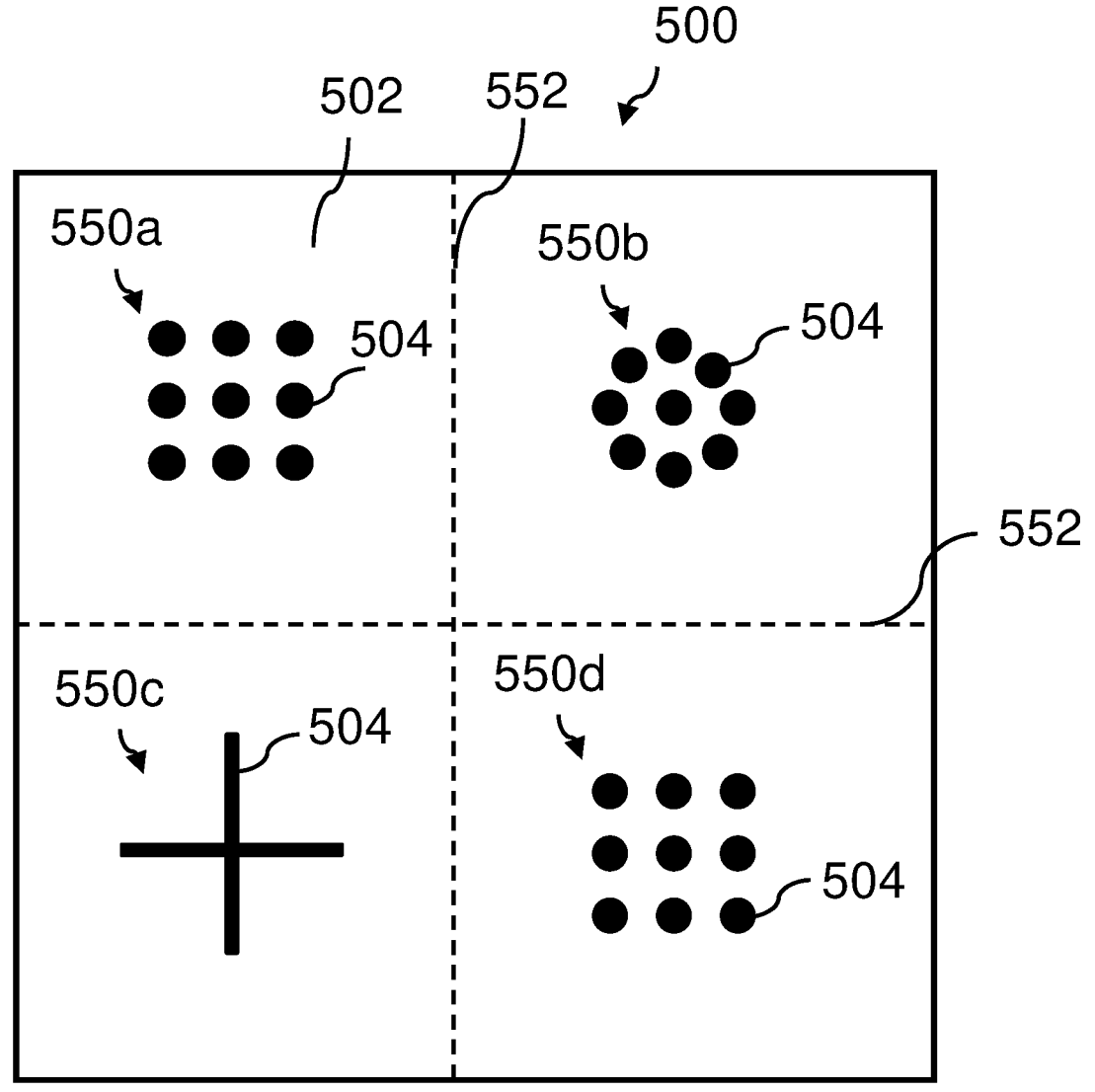
FIG. 5 is a schematic showing a top view of an example of seed structures disposed on a substrate.

FIG. 5 shows examples, from a top view, of seed structures 504 (having various shapes) disposed on a substrate 500. Respective groups 550*a*, 550*b*, 550*c*, 550*d* of seed structures 504 are arranged in arrays or other arrangements. In some implementations, each group 550*a*, 550*b*, 550*c*, 550*d* may structure a coating provided on the substrate 500, to create a corresponding optical element from the coating (e.g., by defining local thicknesses of the coating based on respective heights of the seed structures 504). In this example (where the substrate surface 502 is flat), the structure of the coating depends on the respective heights, shapes, and arrangements of the seed structures 504. For example, if all seed structures 504 have the same height, the group 550*a* may result in a coating in the shape of a mesa. As another example, if the seed structures 504 have varying heights, the group 550*a* may result in the coating having a pyramid or dome shape.

As described above, in some implementations, the seed structures may be disposed having various shapes and patterns, each shape and pattern corresponding to a different structure formed by the resulting coating.

Subsequent to providing the coating, the underlying substrate 500 (and the coating) may be diced along the dicing tracks 552. After dicing, the coating associated with each array 550*a*, 550*b*, 550*c*, 550*d* forms part of a respective singulated optical device.

Before or after dicing, the coating may be etched, as described above, such that coating remains only on portions of the substrate that include seed structures 550*a*, 550*b*, 550*c*, 550*d*.

Figure 6:
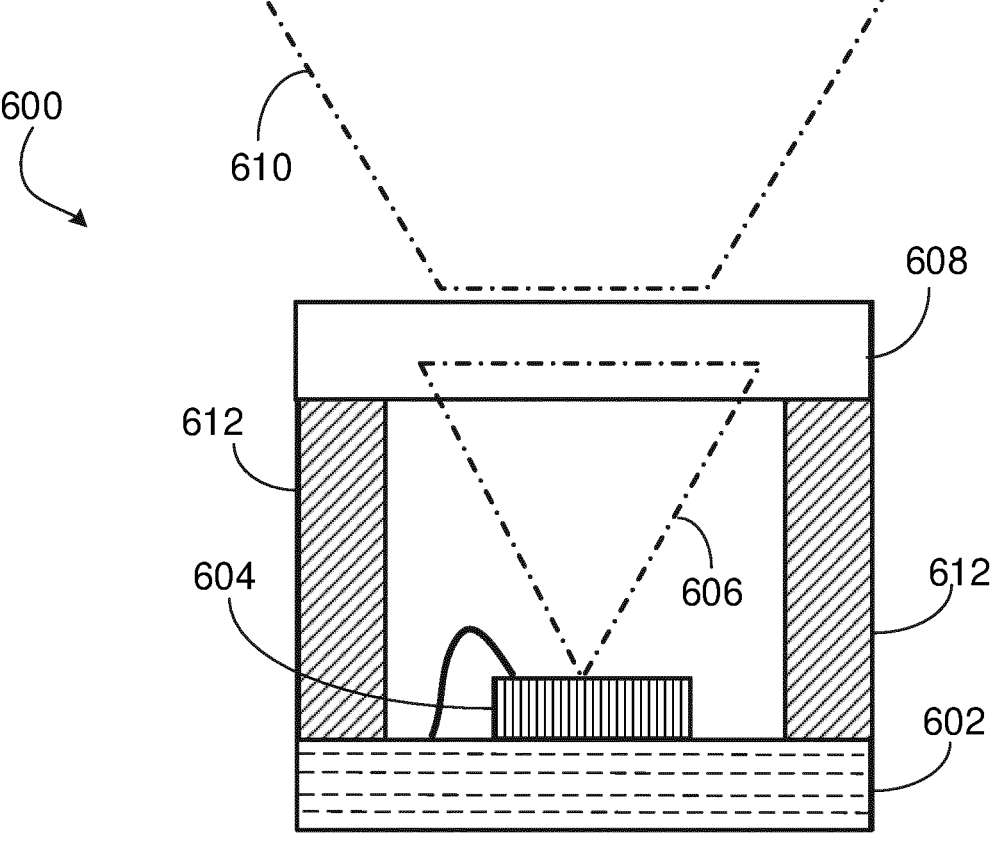
FIG. 6 is a schematic showing an example of an optoelectronic module.

In some implementations, devices fabricated by a process including seed structures described above, or devices having one or more characteristics described above, may be integrated into optoelectronic or other modules. As shown in FIG. 6, a module 600 includes a substrate 602 and a light-emitting component 604 coupled to or integrated into the substrate 602. The light-emitting component 604 may include, for example, a laser (e.g., a vertical-cavity surface-emitting laser) or a light-emitting diode.

Light 606 generated by the light-emitting component 604 is transmitted through a housing and then to an optical device 608, e.g., an optical device as shown in FIG. 1B, 2B, 2C, 3B, 3D, or 3E. The optical device 608 is operable, as described above, to modify the light 606 as the light 606 passes through the optical device 608, such that modified light 610 is transmitted out of the module 600. For example, the module 600, using the optical device 608, may produce one or more of structured light, diffused light, or patterned light. The housing may include, for example, spacers 612 separating the light-emitting component 604 and/or the substrate 602 from the optical device 608.

In some implementations, the module 600 of FIG. 6 is a light-sensing module (for example, an ambient light sensor), the component 604 is a light-sensing component (for example, a photodiode, a pixel, or an image sensor), the light 606 is incident on the module 600, and the light 610 is modified by the optical device 608 as the light 610 passes through the optical device 608. For example, the optical device 608 may focus patterned light onto the light-sensing component 704.

In some implementations, the module 600 may including both light-emitting and light-sensing components. For example, the module 600 may emit light that interacts with an environment of the module 600 and is then received back by the module 600, allowing the module 600 to act, for example, as a proximity sensor or as a three-dimensional mapping device.

The modules described above may be part of, for example, time-of-flight cameras or active-stereo cameras. The modules may be integrated into system, for example, mobile phones, laptops, wearable devices, or automotive vehicles.

Because of the inclusion of seed structures as part of the fabrication process of the module 600, the module 600 may, in some instances, be fabricated at less expense, in less time, and/or more simply than equivalent modules fabricated by other means. In some implementations, the use of seed structures may enable structured coatings made of a high RI material, enhancing module operation, increasing module safety, and/or increasing a compactness of the module 600.

Although this disclosure sometimes refers to optical devices, the methods, devices, and modules described are not limited to, nor required to include, optical functionality. For example, structured coatings (the coatings, in various implementations, created at least in part based on underlying seed structures, having underlying seed structures, or having voids) may be provided and processed in order to fabricate non-optical devices, or devices that have both an optical functionality and a non-optical functionality.

Although particular implementations have been described in detail, various modifications can be made. As one example, the processes depicted in the figures do not necessarily require the particular order shown, or sequential order, to achieve desirable results. In certain implementations, multitasking and parallel processing may be advantageous. Accordingly, other implementations are within the scope of the claims.

What is claimed is:

1. A method comprising:
disposing a plurality of seed structures on a surface of a substrate using a replication process; and
providing a coating over a surface of the substrate, wherein the coating entirely fills spaces between adjacent ones of the seed structures,
wherein providing the coating comprises depositing the coating using a surface growth technique, and wherein the coating is grown at least in part from surfaces of the plurality of seed structures such that the coating extends above a topmost surface of each seed structure by a first thickness, and wherein a spacing between each adjacent seed structure is less than twice the first thickness,
wherein respective heights of the seed structures define local thicknesses of the coating, wherein the plurality of seed structures and the local thicknesses of the coating together define a diffractive optical element, and wherein the diffractive optical element is a lens,
wherein at least some of the seed structures have a height that differs from a height of other ones of the seed structures.

2. The method of claim 1, wherein the plurality of seed structures are disposed on an underlying stepped surface of the substrate,
wherein an exposed surface of the coating has a profile corresponding to a profile defined by distal surfaces of the seed structures, and
wherein an underlying surface of the coating follows the underlying stepped surface of the substrate.

3. The method of claim 1, wherein the coating is deposited using atomic layer deposition or chemical vapor deposition.

4. The method of claim 1, wherein the plurality of seed structures comprise at least one of pillars or walls.

5. The method of claim 1, wherein the plurality of seed structures are projections from the surface of the substrate.

6. The method of claim 1, further comprising:

subsequent to providing the coating, removing part of the coating, so that at least portions of the surface of the substrate on which no seed structures are disposed have no overlying coating.

7. The method of claim 1, wherein the substrate is a first substrate, and wherein the method further comprises:

attaching a second substrate to an exposed surface of the coating, and removing the first substrate and the seed structures.

8. The method of claim 1, wherein disposing the plurality of seed structures on the surface of a substrate using the replication process comprises imprinting a receiving material to form the seed structures on the surface of the substrate.

9. An optical device comprising:

a substrate;

a plurality of seed structures on a surface of the substrate; and a coating on the seed structures and on the surface of the substrate, wherein the coating is in contact with the topmost and side surfaces of each seed structure, the coating extends above the topmost surface of each seed structure by a first thickness, and a spacing between each adjacent seed structure is less than twice the first thickness wherein respective heights of the seed structures define local thicknesses of the coating, wherein the plurality of seed structures and the local thicknesses of the coating together define a diffractive optical element, wherein the diffractive optical element is a lens, and wherein the coating entirely fills spaces between adjacent ones of the seed structures.

10. The optical device of claim 9, wherein the diffractive optical element is a lens.

11. The optical device of claim 9, wherein the plurality of seed structures are projections from the surface of the substrate, and wherein at least some of the projections have a height that differs from a height of other ones of the projections.

12. The optical device of claim 9, wherein the coating entirely fills in spaces between adjacent seed structures.

13. A module comprising:

at least one of a light-emitting device or a light-sensitive device; and an optical device in accordance with claim 9, wherein the optical device is configured (i) to interact with light generated by the light emitting device or (ii) to interact with light incident on the module such that light passing through the optical device is received by the light-sensitive device.

14. An optical device comprising:

a substrate; and a coating on a surface of the substrate, wherein a plurality of voids are formed in the coating, wherein the coating forms at least one optical element, wherein the at least one optical element comprises a diffractive optical element that is a lens, wherein the voids project from a surface of the coating towards the surface of the substrate, wherein portions of the coating in which the voids are formed comprise at least two different thicknesses, wherein a non-zero thickness of the coating from the substrate to each void is the same, and wherein a thickness of the coating between neighboring voids differs in at least two regions.

* * * * *